March 6, 1962 R. T. BUTLER 3,024,038
SUSPENSION STRUCTURE FOR VEHICLES
Filed Sept. 22, 1958
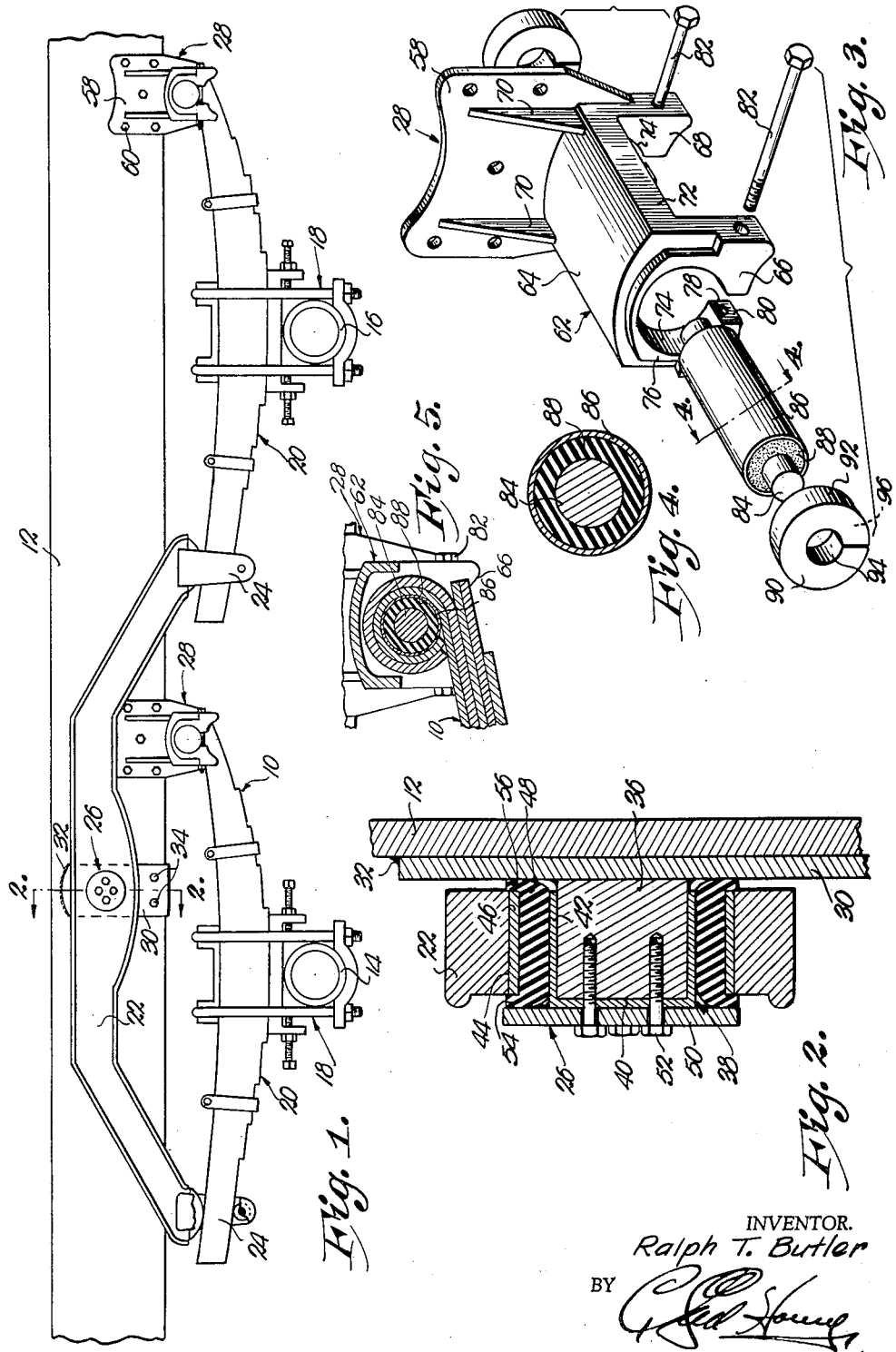
INVENTOR.
Ralph T. Butler
BY
ATTORNEY.

United States Patent Office 3,024,038
Patented Mar. 6, 1962

3,024,038
SUSPENSION STRUCTURE FOR VEHICLES
Ralph T. Butler, 2263 Bancroft, Springfield, Mo.
Filed Sept. 22, 1958, Ser. No. 762,379
9 Claims. (Cl. 280—104.5)

This invention relates to structure adapted for connecting a wheel and axle suspension assembly to the frame of a vehicle or the like, and has for its primary object to provide an improved connector unit for attaching a part of the suspension assembly to the vehicle frame in a manner to eliminate vibration normally imparted to the frame from the suspension assembly, as well as serving to more evenly distribute the weight carried by the frame onto the suspension assembly, particularly when the latter constitutes a conventional tandem suspension.

It is also an important object of the invention to provide a connector unit for attaching a wheel and axle suspension assembly to the frame of a vehicle which is relatively lightweight and permits elimination of components heretofore utilized, such as torque rods interconnecting the axle of the suspension assembly and one of the brackets rigidly secured to the vehicle frame, the instant connector unit providing improved weight distribution when the same is employed at all points where it is necessary to pivotally mount the suspension assembly on the frame.

A further important object is to provide a connector unit as described including a pair of spaced members disposed in relatively telescoped relationship and a resilient, tubular component interposed between, bonded to and interconnecting the members with one of the latter being adapted to be secured to the suspension assembly and the other member being adapted to be mounted to the vehicle frame whereby rotation of that part of the suspension assembly connected to one of the members is permitted to rotate relative to the frame only through a predetermined arc, effectively damps vibration normally imparted to the frame by the suspension structure during movement of the vehicle, and also assures even distribution of weight from the vehicle to the suspension assembly.

Another important object of the invention is to provide a connector unit of the construction set forth above wherein the resilient component is of rubber and vulcanized to the relatively telescoped members, whereby distortion of the rubber component under stress is minimized and thereby materially increasing the useful life of the connector unit and precluding the necessity of replacing the same at frequent intervals.

Also an important object is to provide connector units for attaching a wheel and axle suspension assembly to a vehicle frame wherein the rubber component bonded to the members secured to the assembly and frame respectively, prevents stress from being imparted to the axle hanger structure from the frame.

Other equally important objects of the invention include the provision of a connector unit which may be utilized with conventional tandem suspension assemblies or the like without substantial modification of the same; to a connector unit which is constructed in a novel manner permitting the same to be removed and replaced from the vehicle in a minimum of time and with only simple, readily available tools being necessary; to a connector unit which may be fabricated and distributed at a low unit cost:

and to other important objects and details of construction which will become obvious or be explained more fully as the following specification progresses.

In the drawing:

FIGURE 1 is a fragmentary, side elevational view of a tandem suspension assembly connected to a vehicle frame through utilization of connector units embodying the principles of the instant invention;

FIG. 2 is an enlarged, fragmentary view taken substantially on the vertical line 2—2 of FIG. 1;

FIG. 3 is an exploded perspective view of another type of connector unit made in accordance with the present invention and adapted for attaching another part of the suspension assembly to the vehicle frame;

FIG. 4 is an enlarged, cross-sectional view taken substantially on the line 4—4 of FIG. 3; and FIG. 5 is a fragmentary, cross-sectional view of one end of the leaf springs forming a part of the instant invention.

In order to more clearly represent the manner in which the instant connector units are adapted for mounting a wheel and axle suspension assembly to the frame of a vehicle, a tandem suspension broadly numerated 10 is shown in the drawing in its normal position relative to a vehicle frame member 12. Tandem suspension 10 conventionally includes a pair of substantially parallel, horizontally spaced axles 14 and 16 which may be tubular as shown or I-beams, as well as a hanger assembly 18 for each axle 14 and 16 releasably attaching a leaf spring unit 20 to each axle 14 and 16 in overlying relationship thereto, as clearly shown in FIG. 1.

A horizontal equalizer bar 22 overlying the spring unit 20 above axle 14 and connected to corresponding ends of units 20 by brackets 24, is pivotally mounted on frame member 12 through utilization of a connector unit 26 constituting one embodiment of the instant invention and positioned intermediate the ends of equalizer bar 22. The ends of spring units 20 opposed to corresponding ends secured to equalizer bar 22, are pivotally joined to frame member 12 by horizontally spaced connector units 28 embodying the principles of this invention in another form.

Connector unit 26 comprises a substantially flat, upright bracket plate 30 and is secured to the outer vertical face of frame member 12 at a point substantially equidistant between the ends of equalizer bar 22 when tandem suspension 10 is disposed at its conventional location relative to the vehicle frame, plate 30 being rigidly connected to frame member 12 by a line of welding 32 across the upper edge of the plate and also by bolt and nut means 34 extending through plate 30 and across member 12. A cylindrical extension 36 is also welded to the outer face of bracket plate 30 and is adapted to be telescoped within a substantially cylindrical, cup-shaped member 38 having an outer circular end wall 40 and a cylindrical side wall 42 engaging the outer cylindrical surface of extension 36.

Equalizer bar 22 is provided with a central opening 44 of a suitable diameter to receive a cylindrical member 46 press fitted thereinto, it thus being apparent that member 46 is disposed in surrounding, spaced relationship to member 38 and extension 36 and also concentric with the same. A tubular component 48 is interposed between and interconnects members 38 and 46, and is preferably formed of rubber with the outer faces thereof engaging respective members 38 and 46 suitably bonded to the same as by vulcanizing or the like. As best shown in FIG. 2, component 48 is somewhat longer than member 46 with the outer ends thereof extending beyond member 46 a relatively short, predetermined distance.

A circular holding plate 50 is disposed in overlying relationship to end wall 40 of member 38 and a plurality of stud bolts 52 extending through plate 50 and end wall 40 of member 38 and threaded into extension 36, serve to releasably maintain plate 50 against member 38 and extension 36.

It is to be noted that when plate 50 is moved into firm engagement with member 38 and thereby extension 36 by stud bolts 52, the outer peripheral edge 54 of component 48 is squeezed between the outer margin of plate 50 and the circular outer edge of member 46, while the inner circular edge 56 of component 48 is squeezed between plate 30 and the inner circular edge of member 46, as shown in FIG. 2.

Connector unit 28 is similar to unit 26 and the same has a normally upright, irregularly shaped mounting plate 58 adapted to be secured to the same outer face of frame member 12 upon which bracket plate 30 is mounted, and a plurality of bolts 60 extending through plate 58 and frame member 12 are utilized to releasably secure the same to the frame of the vehicle.

A housing broadly numerated 62 is integral with plate 58 and includes an upper, transversely arcuate, top wall 64 extending laterally from plate 58 and having end walls 66 and 68 at opposed ends thereof, depending from the same and disposed in horizontal parallelism. Gussets 70 extending between plate 58 and top wall 64 of housing 62 serve to reinforce housing 62, while relatively narrow side walls 72 extending along opposed, longitudinal edges of top wall 64 and integral with end walls 66 and 68 serve to reinforce the latter.

Each of the end walls 66 and 68 has an opening 74 therein presented by a split, annular band 76 integral with respective end walls 66 and 68, and slots 78 extending from the outer edges of end walls 66 and 68 through the same and into intercommunication with openings 74, permit opposed faces 80 of end walls 66 and 68 defined by slots 78 to be moved toward each other a limited distance. Bolts 82 extending transversely through end walls 66 and 68 adjacent the normally lowermost edges thereof extend across slots 78 and permit opposed faces 80 to be drawn toward each other as bolts 82 are tightened.

Means adapted for releasably attaching one end of a spring unit 20 to housing 62 includes a cylindrical, inner member 84 of a length substantially equal to the distance between outer edges of opposed bands 76 integral with walls 66 and 68 of housing 62, and an outer cylindrical member 86 is positioned in surrounding relationship to and spaced from member 84. As shown in FIG. 3, outer member 86 is somewhat shorter than cylindrical member 84 and is disposed centrally of the latter. A tubular component 88 is interposed between and interconnects members 84 and 86 with component 88 preferably being formed of rubber and bonded to respective members 84 and 86 as by vulcanization or the like. It should be noted at this juncture that spring unit 20 preferably has a hook-shaped element at one end thereof which may comprise an integral extension of one of the leaves and which is adapted to receive member 86, with the latter being press fitted into the hook.

Structure for releasably maintaining members 84 and 86 as well as component 88 within housing 62 comprises a pair of substantially identical split rings 90 having an outer, peripheral, cylindrical surface 92 of a diameter substantially equal to the inner diameter of band 76, while the inner, circular edge 94 is dimensioned so as to frictionally receive a corresponding outer end of member 84 projecting from tubular component 88 which is substantially equal in length to member 86. Each of the rings 90 is provided with a groove 96 in the surface 92 thereof disposed transversely with respect to the axis of ring 90 for clearing a respective bolt 82 when the latter is threaded into corresponding end walls 66 and 68 of housing 62 and when ring 90 is positioned within a respective band 76. It can now be recognized that as bolts 82 are tightened, faces 80 of end walls 66 and 68 are moved toward each other to thereby decrease the effective diameter of ring 90 and causing inner edge 94 of respective rings 90 to tightly engage corresponding outer ends of member 84.

It is to be noted that a connector unit 28 is utilized to secure one end of each of the spring units 20 to frame member 12, while the opposite ends of such spring units 20 are swingably joined to opposed ends of equalizer bar 22 and the latter in turn being connected at a central point to the outer face of frame member 12.

During operation of the vehicle on a road or the like, it can be perceived that as the wheels of the carrier move over irregular surfaces in the terrain, axles 14 and 16 are moved in vertical directions against the action of spring units 20. Since the wheels connected to one of the axles 14 or 16 reach the irregular surface prior to the wheels of the other axle, it can be readily determined that one of the axles 14 or 16 tends to swing equalizer bar 22 about the axis of extension 36 and, thereby, frame member 12. The purpose of equalizer bar 22 is to assure even distribution of the weight carried by frame 12 to all of the wheels of the vehicle, and it can be seen that connector unit 26 does not impair equalization in any manner whatsoever but, in fact, facilitates equal distribution of the load to both of the axles 14 and 16 substantially regardless of the road conditions encountered. Resilient component 48 does not prevent relative rotation between equalizer bar 22 and frame member 12 but only limits the relative rotation to a predetermined arc while at the same time, damping vibration which would ordinarily be transmitted from tandem suspension 10 to frame member 12. The arc through which equalizer bar 22 may swing relative to member 12 will, of course, be determined by the material from which component 48 is constructed, as well as the thickness thereof, but it is particularly contemplated that the rubber from which component 48 is formed be of such character to permit equalizer bar 22 to swing through an arc of about 15°.

It is also to be understood that during swinging movement of equalizer bar 22 through a limited arc, the ends of respective units 20 coupled with equalizer bar 22 are raised or lowered as the case may be, thus tending to raise or lower the opposite end of such spring units. Pivoting of the ends of spring units 20 joined to frame member 12 by connector units 28 is limited by members 84 and 86 interconnected by component 88, inasmuch as the latter is bonded to members 84 and 86 and thus, member 86 and thereby the end of spring unit 20 connected thereto may rotate only through a limited arc relative to member 84 and thereby, a frame member 12 to which the same is rigidly connected.

From the foregoing, it can be seen that connector units 26 and 28 permit securing of tandem suspension 10 to frame 12 of the vehicle without the utilization of torque bars interconnecting the axles and one end of corresponding spring units 20 and furthermore, direct stress on hanger assemblies 18 from frame 12 is precluded by virtue of the removal of the conventional, substantially inflexible torque rods.

Vulcanization of rubber components 48 and 88 to members 38 and 46, and 84 and 86 respectively, minimizes distortion of the resilient components under stress and also assures restriction of the relative rotation between the elements of tandem suspension 10 with respect to frame 12.

Utilization of connector units 26 and 28 permits elimination of various components, as outlined above, thereby decreasing the weight of the unit and also providing effective damping of vibration without the employment of expensive, complicated mechanisms. A feature of connector units 26 and 28 is the fact that the same may be readily mounted on or removed from suspension 10 andu the members interconnected by tubular components 48 and 88 may be replaced in a short period of time, as required.

Having thus described the invention what is claimed as new and desired to be secured by Letters Patent is:

1. In structure for connecting a wheel and axle suspension assembly provided with a spring having a hook at one end thereof, to the frame of a vehicle, a cylindrical member; a tubular element surrounding said member in spaced relationship thereto, of lesser length than said member, disposed centrally with respect to the latter and adapted to be press fitted into said hook of the spring; a tubular component of resilient material interposed between, bonded to and interconnecting the member and the element for limiting relative rotation and radial movement between the same; bracket means adapted to be rigidly secured to said frame, said bracket means including mounting means releasably engaging opposed ends of the member extending outwardly from opposite ends of the element said mounting means including a housing normally disposed in surrounding relationship to the member and having opposed end walls proximal to corresponding opposed outer ends of said member, said end walls being provided with aligned openings therein of greater diameter than the element; and ring means frictionally positioned within each of the openings and releasably engaging opposed outer ends of the member for securing the latter to the housing and thereby said frame.

2. Structure as set forth in claim 1 wherein each of said ring means includes a split ring having an aperture therein of predetermined size to receive respective outer ends of the member, each of said end walls having a slot therein extending from a corresponding opening to the margin of the wall and take-up means on each of said walls and extending across a respective slot whereby the effective diameter of the opening and thereby the ring may be changed to rigidly secure the member to said housing.

3. Structure as set forth in claim 2 wherein said material is characterized by permitting the element to rotate relative to the member through an arc of not more than approximately 15°.

4. In structure for connecting a pair of wheel and axle suspension assemblies to the frame of a vehicle, an elongated, rigid equalizer bar having an opening therein intermediate the ends of the same; first bracket means for said equalizer bar and adapted to be mounted on the frame adjacent said opening in the bar; first damping means coupling the bar to said bracket and positioned within said opening therein for limiting rotational and radial movement of the bar about the axis of said opening; leaf spring means adapted to be secured to each of the axles of said assemblies and extending outwardly therefrom in opposite directions, one extremity of each of the leaf spring means at corresponding ends thereof being carried by a respective end of said bar; second bracket means for each of said leaf spring means and adapted to be secured to the frame in spaced relationship adjacent corresponding other extremities of the leaf spring means opposed to said one extremity of each; and second damping means coupling said other extremities of the corresponding leaf spring means to respective second bracket means to limit rotational and radial movement of the proximal extremities of the leaf spring means relative to said second bracket means, said first bracket means including a mounting plate adapted to be secured to the frame, said first damping means including a cylindrical member of somewhat lesser diameter than said opening rigidly secured to said mounting plate and telescoped within said opening, a sleeve press fitted in said opening and surrounding said member in spaced relationship thereto, a tubular component of resilient material interposed between and interconnecting the member and said sleeve, said component being of greater length than the sleeve and the member and extending outwardly therefrom in both directions, and a holding plate secured to said member and compressing the component between the latter and said mounting plate.

5. Structure as set forth in claim 4 wherein said other extremities of the springs have J-shaped hooks thereon, said second damping means each including a cylindrical member, a tubular element surrounding a respective member in spaced relationship thereto, of lesser length than a corresponding member, disposed centrally with respect to the latter and adapted to be press fitted into said hook of a respective spring, a tubular component of resilient material interposed between and interconnecting a respective element and member for limiting relative rotation and radial movement between the same, and mounting means forming a part of each of said second bracket means, releasably engaging opposed ends of a respective member extending outwardly from opposite ends of corresponding elements.

6. Structure as set forth in claim 5 wherein each of said mounting means includes a housing normally disposed in surrounding relationship to a respective member and having opposed end walls spaced apart a distance slightly greater than the length of a corresponding member, said end walls being provided with aligned openings therein of greater diameter than a corresponding element, and holding means frictionally positioned within each of the openings and releasably engaging opposed outer ends of a respective member for securing the latter to the housing and thereby said frame.

7. Structure as set forth in claim 6 wherein each of said holding means includes a split ring having an aperture therein of predetermined size to receive respective outer ends of a corresponding member, each of said end walls having a slot therein extending from a respective opening to the margin of the wall and take-up means on each of said walls and extending across a respective slot whereby the effective diameter of the opening, and thereby the ring, may be changed to rigidly secure a respective member to said housing.

8. Structure as set forth in claim 7 wherein said material is characterized by permitting a corresponding element to rotate relative to a respective member through an arc of not more than approximately 15 degrees.

9. In structure for connecting a wheel and axle suspension assembly, provided with an elongated, rigid equalizer bar having an opening therein, to the frame of a vehicle, bracket means adapted to be secured rigidly to said frame; a cup-like, cylindrical member having a wall closing one end thereof; a cylindrical extension telescoped within said cup-like member and in complemental engagement therewith, said extension being rigidly secured to said bracket means and extending outwardly therefrom, a tubular, cylindrical member surrounding said cup-like member in radially spaced relationship thereto and in outwardly spaced relationship to said bracket means, said tubular member adapted to be press fitted into said opening in the equalizer bar; a tubular component of resilient material interposed between, bonded to and interconnecting the cup-like member and the tubular member for limiting relative rotation and radial movement therebetween, said component being of a length greater than the length of said members and extending outwardly therefrom beyond the opposed extremities thereof, said component being normally in engagement at one peripheral edge thereof with said bracket means when said members surround said extension; a circular holding plate having a diameter substantially equal to the diameter of said tubular member; and fastening means on said holding plate for securing the latter to said cup-like member and said extension and for forcing said plate into engagement with the opposite peripheral edge of said component, said plate being in substantial engagement with said wall of said cup-like member and compressing opposed peripheral edges of said component into overlapping relationship to the corresponding extremities of said tubular member when said plate is secured to said cup-like member and said extension.

References Cited in the file of this patent

UNITED STATES PATENTS

| | | |
|---|---|---|
| 1,745,431 | Marcum | Feb. 4, 1930 |
| 2,226,100 | Larison | Dec. 24, 1940 |
| 2,467,548 | Bradley | Apr. 19, 1949 |
| 2,585,489 | Myers | Feb. 12, 1952 |
| 2,686,061 | Johnson et al. | Aug. 10, 1954 |
| 2,741,491 | Van Raden | Apr. 10, 1956 |
| 2,810,587 | Boughner | Oct. 22, 1957 |
| 2,843,395 | Brumbaugh | July 15, 1958 |
| 2,880,991 | Ward | Apr. 7, 1959 |

FOREIGN PATENTS

| | | |
|---|---|---|
| 289,247 | Great Britain | Apr. 26, 1928 |